US012007973B2

(12) United States Patent
Hara et al.

(10) Patent No.: US 12,007,973 B2
(45) Date of Patent: Jun. 11, 2024

(54) INFORMATION PROCESSING METHOD, NON-TRANSITORY COMPUTER READABLE MEDIUM HAVING RECORDED THEREON PROGRAM, AND INFORMATION PROCESSING DEVICE

(71) Applicant: Panasonic Intellectual Property Management Co., Ltd., Osaka (JP)

(72) Inventors: Nobuo Hara, Osaka (JP); Mikio Ushioda, Osaka (JP); Akihisa Nakahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 359 days.

(21) Appl. No.: 17/396,647

(22) Filed: Aug. 6, 2021

(65) Prior Publication Data

US 2022/0067015 A1 Mar. 3, 2022

(30) Foreign Application Priority Data

Aug. 27, 2020 (JP) .................................. 2020-143562

(51) Int. Cl.
*G06F 16/22* (2019.01)
*G05B 19/042* (2006.01)

(52) U.S. Cl.
CPC ..... *G06F 16/2282* (2019.01); *G05B 19/0426* (2013.01)

(58) Field of Classification Search
CPC ............ G06F 16/2282; G05B 19/0426; G05B 19/4083; G05B 2219/35356; F02D 41/2432; G01M 15/04
See application file for complete search history.

(56) References Cited

U.S. PATENT DOCUMENTS 8,751,273 B2 * 6/2014 Pinto ................... G06Q 10/067
705/7.11
2003/0217337 A1 * 11/2003 Prewett .................. G05B 17/02
703/2

(Continued)

FOREIGN PATENT DOCUMENTS

JP  2006-017698       1/2006
JP  2008-241337      10/2008
JP  2008241337  A  * 10/2008

OTHER PUBLICATIONS

M. Uy and J. K. Telford, "Optimization by Design of Experiment techniques," 2009 IEEE Aerospace conference, Big Sky, MT, USA, 2009, pp. 1-10, doi: 10.1109/AERO.2009.4839625. (Year: 2009).*

*Primary Examiner* — Paul B Yanchus, III
*Assistant Examiner* — Tyler Dean Hedrick
(74) *Attorney, Agent, or Firm* — WENDEROTH, LIND & PONACK L.L.P.

(57) ABSTRACT

An information processing method includes: creating a first table; calculating a first response surface using the first table in which an object variable is recorded, the object variable acquired when experimental conditions of a first control factor is fixed to a first level value; adding the experimental conditions of the first control factor in which the first level value is set to the first table when the first response surface does not include a target value related to the object variable; creating a second table by adding a plurality of combinations of the experimental conditions for each of the plurality of control factors in which a first plurality of level values are set and the first control factor in which a second plurality of level values are set to the first table; calculating a second response surface including the target value using the second table; and outputting the second response surface.

6 Claims, 18 Drawing Sheets

(56) References Cited

U.S. PATENT DOCUMENTS

| | | | |
|---|---|---|---|
| 2008/0279434 A1* | 11/2008 | Cassill | G06Q 10/06 382/131 |
| 2016/0040478 A1* | 2/2016 | Lundy | E06B 9/68 700/275 |
| 2021/0350049 A1* | 11/2021 | Zadorojniy | G05B 13/0265 |

* cited by examiner

FIG. 3

| No. | Control factor (temperature) | | | |
|---|---|---|---|---|
| | X1 | X2 | X3 | X4 |
| 1 | 1 | 1 | -1 | 1 |
| 2 | 1 | -1 | -1 | -1 |
| 3 | 0 | -1 | 1 | -1 |
| 4 | 0 | -1 | -1 | 1 |
| 5 | -1 | 1 | -1 | 1 |
| 6 | 0 | 0 | 1 | 0 |
| 7 | 1 | 1 | 1 | -1 |
| 8 | 0 | -1 | 0 | 0 |
| 9 | -1 | 0 | 0 | 0 |
| 10 | -1 | -1 | -1 | -1 |
| 11 | -1 | 0 | 0 | 1 |
| 12 | 0 | 1 | 0 | 0 |
| 13 | 0 | 0 | -1 | 0 |
| 14 | 0 | 0 | 0 | -1 |
| 15 | 0 | 0 | 0 | 1 |
| 16 | 0 | 1 | -1 | -1 |
| 17 | 0 | 1 | 1 | 1 |
| 18 | 1 | -1 | 1 | 1 |
| 19 | 1 | 0 | 0 | 0 |
| 20 | -1 | -1 | 1 | 1 |
| 21 | -1 | 1 | 1 | -1 |

FIG. 4

| No. | Control factor (temperature) | | | | | Object variable (film thickness [mm]) |
|---|---|---|---|---|---|---|
| | X1 | X2 | X3 | X4 | X5 | |
| 1 | 1 | 1 | -1 | 1 | 0 | 0.1 |
| 2 | 1 | -1 | -1 | -1 | 0 | 0.1 |
| 3 | 0 | -1 | 1 | -1 | 0 | -0.8 |
| 4 | 0 | -1 | -1 | 1 | 0 | -0.4 |
| 5 | -1 | 1 | -1 | 1 | 0 | -0.4 |
| 6 | 0 | 0 | 1 | 0 | 0 | -0.4 |
| 7 | 1 | 1 | 1 | -1 | 0 | -0.3 |
| 8 | 0 | -1 | 0 | 0 | 0 | -0.5 |
| 9 | -1 | 0 | 0 | 0 | 0 | -0.3 |
| 10 | -1 | -1 | -1 | -1 | 0 | 0.6 |
| 11 | -1 | 0 | 0 | 1 | 0 | -0.3 |
| 12 | 0 | 1 | 0 | 0 | 0 | -0.7 |
| 13 | 0 | 0 | -1 | 0 | 0 | -0.1 |
| 14 | 0 | 0 | 0 | -1 | 0 | -0.5 |
| 15 | 0 | 0 | 0 | 1 | 0 | -0.7 |
| 16 | 0 | 1 | -1 | -1 | 0 | 0.1 |
| 17 | 0 | 1 | 1 | 1 | 0 | -0.1 |
| 18 | 1 | -1 | 1 | 1 | 0 | -0.2 |
| 19 | 1 | 0 | 0 | 0 | 0 | -0.4 |
| 20 | -1 | -1 | 1 | 1 | 0 | 0.1 |
| 21 | -1 | 1 | 1 | -1 | 0 | -0.8 |

FIG. 6

| No. | Control factor (temperature) | | | | | Object variable (film thickness [mm]) |
|---|---|---|---|---|---|---|
| | X1 | X2 | X3 | X4 | X5 | |
| 1 | 1 | 1 | -1 | 1 | 0 | 0.1 |
| 2 | 1 | -1 | -1 | -1 | 0 | 0.1 |
| 3 | 0 | -1 | 1 | -1 | 0 | -0.8 |
| 4 | 0 | -1 | -1 | 1 | 0 | -0.4 |
| 5 | -1 | 1 | -1 | 1 | 0 | -0.4 |
| 6 | 0 | 0 | 1 | 0 | 0 | -0.4 |
| 7 | 1 | 1 | 1 | -1 | 0 | -0.3 |
| 8 | 0 | -1 | 0 | 0 | 0 | -0.5 |
| 9 | -1 | 0 | 0 | 0 | 0 | -0.3 |
| 10 | -1 | -1 | -1 | -1 | 0 | 0.6 |
| 11 | -1 | 0 | 0 | 1 | 0 | -0.3 |
| 12 | 0 | 1 | 0 | 0 | 0 | -0.7 |
| 13 | 0 | 0 | -1 | 0 | 0 | -0.1 |
| 14 | 0 | 0 | 0 | -1 | 0 | -0.5 |
| 15 | 0 | 0 | 0 | 1 | 0 | -0.7 |
| 16 | 0 | 1 | -1 | -1 | 0 | 0.1 |
| 17 | 0 | 1 | 1 | 1 | 0 | -0.1 |
| 18 | 1 | -1 | 1 | 1 | 0 | -0.2 |
| 19 | 1 | 0 | 0 | 0 | 0 | -0.4 |
| 20 | -1 | -1 | 1 | 1 | 0 | 0.1 |
| 21 | -1 | 1 | 1 | -1 | 0 | -0.8 |

| No. | Control factor (temperature) | | | | |
|---|---|---|---|---|---|
| | X1 | X2 | X3 | X4 | X5 |
| 1 | 1 | -1 | 1 | -1 | 1 |
| 2 | 1 | -1 | -1 | -1 | -1 |
| 3 | 1 | -1 | 1 | 1 | -1 |
| 4 | 0 | 0 | 0 | 1 | 1 |
| 5 | -1 | -1 | 1 | -1 | -1 |
| 6 | 1 | 1 | -1 | -1 | 1 |
| 7 | 0 | 1 | 1 | -1 | 1 |
| 8 | 1 | -1 | -1 | 1 | 1 |
| 9 | 0 | -1 | 0 | 0 | 0 |
| 10 | 0 | 0 | 1 | 1 | 0 |
| 11 | -1 | 0 | 0 | 0 | 1 |
| 12 | 1 | 1 | 0 | 1 | 0 |
| 13 | 1 | 1 | -1 | 1 | -1 |
| 14 | -1 | 1 | 0 | -1 | 0 |
| 15 | -1 | 1 | -1 | 1 | 1 |
| 16 | 0 | 0 | -1 | 0 | 0 |
| 17 | -1 | -1 | -1 | 1 | -1 |
| 18 | 1 | 0 | 0 | -1 | 0 |
| 19 | -1 | 1 | 1 | 1 | -1 |
| 20 | 1 | 1 | 1 | -1 | -1 |
| 21 | 0 | -1 | 0 | 0 | 0 |
| 22 | 0 | 0 | 0 | 0 | -1 |
| 23 | -1 | -1 | 1 | 1 | 1 |
| 24 | -1 | 1 | -1 | -1 | -1 |
| 25 | 1 | 1 | 1 | 0 | 1 |
| 26 | -1 | -1 | -1 | -1 | 1 |
| 27 | -1 | 0 | 1 | 0 | 0 |

FIG. 10A

| No. | Control factor (temperature) | | | | | Object variable |
|---|---|---|---|---|---|---|
| | X1 | X2 | X3 | X4 | X5 | (film thickness [mm]) |
| 1 | 1 | 1 | -1 | 1 | 0 | 0.1 |
| 2 | 1 | -1 | -1 | -1 | 0 | 0.1 |
| 3 | 0 | -1 | 1 | -1 | 0 | -0.8 |
| 4 | 0 | -1 | -1 | 1 | 0 | -0.4 |
| 5 | -1 | 1 | -1 | 1 | 0 | -0.4 |
| 6 | 0 | 0 | 1 | 0 | 0 | -0.4 |
| 7 | 1 | 1 | 1 | -1 | 0 | -0.3 |
| 8 | 0 | -1 | 0 | 0 | 0 | -0.5 |
| 9 | -1 | 0 | 0 | 0 | 0 | -0.3 |
| 10 | -1 | -1 | -1 | -1 | 0 | 0.6 |
| 11 | -1 | 0 | 0 | 1 | 0 | -0.3 |
| 12 | 0 | 1 | 0 | 0 | 0 | -0.7 |
| 13 | 0 | 0 | -1 | 0 | 0 | -0.1 |
| 14 | 0 | 0 | 0 | -1 | 0 | -0.5 |
| 15 | 0 | 0 | 0 | 1 | 0 | -0.7 |
| 16 | 0 | 1 | -1 | -1 | 0 | 0.1 |
| 17 | 0 | 1 | 1 | 1 | 0 | -0.1 |
| 18 | 1 | -1 | 1 | 1 | 0 | -0.2 |
| 19 | 1 | 0 | 0 | 0 | 0 | -0.4 |
| 20 | -1 | -1 | 1 | 1 | 0 | 0.1 |
| 21 | -1 | 1 | 1 | -1 | 0 | -0.8 |
| 22 | 1 | 1 | 1 | -1 | -1 | 0.6 |
| 23 | 1 | -1 | 1 | -1 | 1 | -0.3 |
| 24 | 1 | -1 | -1 | 1 | 1 | 0 |
| 25 | -1 | -1 | -1 | 1 | -1 | 0.9 |
| 26 | -1 | -1 | 1 | -1 | -1 | 0.5 |
| 27 | -1 | 1 | -1 | 1 | 1 | -0.1 |
| 28 | 1 | 1 | -1 | 1 | -1 | 0.8 |
| 29 | 1 | -1 | 1 | 1 | -1 | 0.4 |
| 30 | 1 | -1 | -1 | -1 | -1 | 0.8 |
| 31 | -1 | 1 | 1 | 1 | -1 | 0.4 |
| 32 | -1 | -1 | -1 | -1 | 1 | 0.8 |
| 33 | -1 | 1 | -1 | -1 | -1 | 0.9 |
| 34 | 1 | 1 | 1 | 1 | 1 | 0.5 |
| 35 | 1 | 1 | -1 | -1 | 1 | 0.8 |
| 36 | -1 | 1 | 1 | -1 | 1 | -0.5 |

FIG. 10B

| Design | Level of parameter ||||| Number of designs ||| Val_ADD ||| Optimum value | Overall |
| | X1 | X2 | X3 | X4 | X5 | Initial | Addition | Total | Evaluation | Determination | | | |
|---|---|---|---|---|---|---|---|---|---|---|---|---|
| 21 initial designs | -1,0,1 | -1,0,1 | -1,0,1 | -1,0,1 | (0) | 21 | - | 21 | - | - | Unsatisfied | Unsatisfied |
| 27 redesigns | -1,0,1 | -1,0,1 | -1,0,1 | -1,0,1 | -1,0,1 | 21 | 27 | 48 | 0.391 | - | Satisfied | Satisfied |

FIG. 10C

| Design | Level of parameter | | | | | Number of designs | | | Val_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 21 initial designs | -1,0,1 | -1,0,1 | -1,0,1 | -1,0,1 | (0) | 21 | - | 21 | - | - | Unsatisfied | Unsatisfied |
| 6 redesigns | -1,0,1 | -1,0,1 | -1,0,1 | -1,0,1 | -1,0,1 | 21 | 6 | 27 | 0.790 | Unsatisfied | Satisfied | Unsatisfied |
| 8 redesigns | -1,0,1 | -1,0,1 | -1,0,1 | -1,0,1 | -1,0,1 | 21 | 8 | 29 | 0.595 | Unsatisfied | Satisfied | Unsatisfied |
| 10 redesigns | -1,0,1 | -1,0,1 | -1,0,1 | -1,0,1 | -1,0,1 | 21 | 10 | 31 | 0.456 | Unsatisfied | Satisfied | Unsatisfied |
| 12 redesigns | -1,0,1 | -1,0,1 | -1,0,1 | -1,0,1 | -1,0,1 | 21 | 12 | 33 | 0.429 | Unsatisfied | Satisfied | Unsatisfied |
| 14 redesigns | -1,0,1 | -1,0,1 | -1,0,1 | -1,0,1 | -1,0,1 | 21 | 14 | 35 | 0.398 | Unsatisfied | Satisfied | Unsatisfied |
| 15 redesigns | -1,0,1 | -1,0,1 | -1,0,1 | -1,0,1 | -1,0,1 | 21 | 15 | 36 | 0.373 | Satisfied | Satisfied | Satisfied |

FIG. 11A

| No. | Control factor (temperature) | | | | | Object variable (film tickness [mm]) |
|---|---|---|---|---|---|---|
| | X1 | X2 | X3 | X4 | X5 | |
| 1 | 1 | 1 | -1 | 1 | 0 | 0.1 |
| 2 | 1 | -1 | -1 | -1 | 0 | 0.1 |
| 3 | 0 | -1 | 1 | -1 | 0 | -0.8 |
| 4 | 0 | -1 | -1 | 1 | 0 | -0.4 |
| 5 | -1 | 1 | -1 | 1 | 0 | -0.4 |
| 6 | 0 | 0 | 1 | 0 | 0 | -0.4 |
| 7 | 1 | 1 | 1 | -1 | 0 | -0.3 |
| 8 | 0 | -1 | 0 | 0 | 0 | -0.5 |
| 9 | -1 | 0 | 0 | 0 | 0 | -0.3 |
| 10 | -1 | -1 | -1 | -1 | 0 | 0.6 |
| 11 | -1 | 0 | 0 | 1 | 0 | -0.3 |
| 12 | 0 | 1 | 0 | 0 | 0 | -0.7 |
| 13 | 0 | 0 | -1 | 0 | 0 | -0.1 |
| 14 | 0 | 0 | 0 | -1 | 0 | -0.5 |
| 15 | 0 | 0 | 0 | 1 | 0 | -0.7 |
| 16 | 0 | 1 | -1 | -1 | 0 | 0.1 |
| 17 | 0 | 1 | 1 | 1 | 0 | -0.1 |
| 18 | 1 | -1 | 1 | 1 | 0 | -0.2 |
| 19 | 1 | 0 | 0 | 0 | 0 | -0.4 |
| 20 | -1 | -1 | 1 | 1 | 0 | 0.1 |
| 21 | -1 | 1 | 1 | -1 | 0 | -0.8 |
| 22 | -1 | 1 | -1 | 1 | 1 | 0.9 |
| 23 | -1 | -1 | 1 | 1 | 1 | 1.5 |
| 24 | -1 | -1 | -1 | 1 | 1 | 1.4 |
| 25 | -1 | 1 | 1 | 1 | 1 | 1.1 |
| 26 | -1 | 1 | 1 | -1 | 1 | 0.6 |
| 27 | 1 | 1 | 1 | 1 | 0.5 | 1.4 |
| 28 | -1 | 1 | -1 | -1 | 1 | 1.4 |
| 29 | 1 | -1 | 1 | 0 | 1 | 0.8 |
| 30 | 1 | -1 | -1 | -1 | 1 | 1.8 |
| 31 | 1 | -1 | 0 | 1 | 1 | 0.9 |
| 32 | 1 | -1 | -1 | 1 | 0.5 | 0.6 |
| 33 | -1 | -1 | 1 | -1 | 1 | 1.1 |
| 34 | 1 | 0 | 1 | 1 | 1 | 1.2 |
| 35 | 1 | 1 | -1 | -1 | 1 | 2 |
| 36 | 0 | 1 | 0 | -1 | 0.5 | 0.5 |
| 37 | 1 | 1 | -1 | 1 | 1 | 1.4 |
| 38 | -1 | 0 | 1 | 0 | 0.5 | 0.7 |
| 39 | 1 | -1 | 1 | -1 | 0.5 | 0.2 |
| 40 | 1 | 1 | 1 | -1 | 1 | 1.2 |
| 41 | -1 | -1 | -1 | -1 | 1 | 2 |

FIG. 11B

| Design | Level of parameter | | | | | Number of designs | | | Val_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 21 initial designs | -1,0,1 | -1,0,1 | -1,0,1 | -1,0,1 | (0) | 21 | - | 21 | - | - | Unsatisfied | Unsatisfied |
| 27 redesigns | -1,0,1 | -1,0,1 | -1,0,1 | -1,0,1 | 0,0.5,1 | 21 | 27 | 48 | 0.391 | - | Satisfied | Satisfied |

FIG. 11C

| Design | Level of parameter | | | | | Number of designs | | | Val1_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 21 initial designs | -1,0,1 | -1,0,1 | -1,0,1 | -1,0,1 | (0) | 21 | - | 21 | - | - | Unsatisfied | Unsatisfied |
| 8 redesigns | -1,0,1 | -1,0,1 | -1,0,1 | -1,0,1 | 0,0.5,1 | 21 | 8 | 29 | 1.280 | Unsatisfied | Satisfied | Unsatisfied |
| 10 redesigns | -1,0,1 | -1,0,1 | -1,0,1 | -1,0,1 | 0,0.5,1 | 21 | 10 | 31 | 0.874 | Unsatisfied | Satisfied | Unsatisfied |
| 14 redesigns | -1,0,1 | -1,0,1 | -1,0,1 | -1,0,1 | 0,0.5,1 | 21 | 14 | 35 | 0.530 | Unsatisfied | Satisfied | Unsatisfied |
| 18 redesigns | -1,0,1 | -1,0,1 | -1,0,1 | -1,0,1 | 0,0.5,1 | 21 | 18 | 39 | 0.419 | Unsatisfied | Satisfied | Unsatisfied |
| 19 redesigns | -1,0,1 | -1,0,1 | -1,0,1 | -1,0,1 | 0,0.5,1 | 21 | 19 | 40 | 0.396 | Unsatisfied | Satisfied | Unsatisfied |
| 20 redesigns | -1,0,1 | -1,0,1 | -1,0,1 | -1,0,1 | 0,0.5,1 | 21 | 20 | 41 | 0.379 | Satisfied | Satisfied | Satisfied |

FIG. 12A

| No. | Control factor (temperature) | | | | | Object variable (film tickness [mm]) |
|---|---|---|---|---|---|---|
| | X1 | X2 | X3 | X4 | X5 | |
| 1 | 1 | 1 | -1 | 1 | 0 | 0.1 |
| 2 | 1 | -1 | -1 | -1 | 0 | 0.1 |
| 3 | 0 | -1 | 1 | -1 | 0 | -0.8 |
| 4 | 0 | -1 | -1 | 1 | 0 | -0.4 |
| 5 | -1 | 1 | -1 | 1 | 0 | -0.4 |
| 6 | 0 | 0 | 1 | 0 | 0 | -0.4 |
| 7 | 1 | 1 | 1 | -1 | 0 | -0.3 |
| 8 | 0 | -1 | 0 | 0 | 0 | -0.5 |
| 9 | -1 | 0 | 0 | 0 | 0 | -0.3 |
| 10 | -1 | -1 | -1 | -1 | 0 | 0.6 |
| 11 | -1 | 0 | 0 | 1 | 0 | -0.3 |
| 12 | 0 | 1 | 0 | 0 | 0 | -0.7 |
| 13 | 0 | 0 | -1 | 0 | 0 | -0.1 |
| 14 | 0 | 0 | 0 | -1 | 0 | -0.5 |
| 15 | 0 | 0 | 0 | 1 | 0 | -0.7 |
| 16 | 0 | 1 | -1 | -1 | 0 | 0.1 |
| 17 | 0 | 1 | 1 | 1 | 0 | -0.1 |
| 18 | 1 | -1 | 1 | 1 | 0 | -0.2 |
| 19 | 1 | 0 | 0 | 0 | 0 | -0.4 |
| 20 | -1 | -1 | 1 | 1 | 0 | 0.1 |
| 21 | -1 | 1 | 1 | -1 | 0 | -0.8 |
| 22 | 1 | 1 | 1 | -1 | 2 | -0.7 |
| 23 | -1 | -1 | -1 | 1 | 2 | -0.2 |
| 24 | -1 | 1 | 1 | 1 | 2 | -0.7 |
| 25 | 1 | -1 | -1 | -1 | 2 | -0.3 |
| 26 | -1 | -1 | 1 | -1 | 2 | -0.7 |
| 27 | 0 | 0 | -1 | -1 | 1 | -0.7 |
| 28 | 1 | 0 | 1 | 1 | 2 | -0.4 |
| 29 | 1 | 1 | 1 | 1 | 1 | -0.5 |
| 30 | -1 | 1 | 1 | -1 | 2 | -1.2 |
| 31 | 1 | -1 | 1 | -1 | 1 | -1.5 |
| 32 | 1 | -1 | 0 | 1 | 2 | -0.9 |
| 33 | -1 | -1 | -1 | -1 | 2 | 0 |
| 34 | 1 | -1 | 1 | 0 | 2 | -0.8 |
| 35 | 1 | 1 | -1 | 1 | 2 | 0 |
| 36 | -1 | -1 | 0 | 0 | 1 | -0.8 |
| 37 | 1 | 1 | -1 | -1 | 2 | 0.2 |
| 38 | -1 | -1 | 1 | 1 | 2 | -0.4 |
| 39 | -1 | 1 | -1 | -1 | 2 | -0.3 |
| 40 | -1 | 1 | -1 | 1 | 2 | -0.9 |
| 41 | 1 | -1 | -1 | 1 | 1 | -1.3 |

FIG. 12B

| Design | Level of parameter | | | | | Number of designs | | | Vall_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 21 initial designs | -1,0,1 | -1,0,1 | -1,0,1 | -1,0,1 | (0) | 21 | - | 21 | - | - | Unsatisfied | Unsatisfied |
| 27 redesigns | -1,0,1 | -1,0,1 | -1,0,1 | -1,0,1 | 0,1,2 | 21 | 27 | 48 | 0.391 | - | Satisfied | Satisfied |

FIG. 12C

| Design | Level of parameter | | | | | Number of designs | | | Vall_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 21 initial designs | -1,0,1 | -1,0,1 | -1,0,1 | -1,0,1 | (0) | 21 | - | 21 | - | - | Unsatisfied | Unsatisfied |
| 8 redesigns | -1,0,1 | -1,0,1 | -1,0,1 | -1,0,1 | 0,1,2 | 21 | 8 | 29 | 1.440 | Unsatisfied | Satisfied | Unsatisfied |
| 10 redesigns | -1,0,1 | -1,0,1 | -1,0,1 | -1,0,1 | 0,1,2 | 21 | 10 | 31 | 0.874 | Unsatisfied | Satisfied | Unsatisfied |
| 14 redesigns | -1,0,1 | -1,0,1 | -1,0,1 | -1,0,1 | 0,1,2 | 21 | 14 | 35 | 0.530 | Unsatisfied | Satisfied | Unsatisfied |
| 18 redesigns | -1,0,1 | -1,0,1 | -1,0,1 | -1,0,1 | 0,1,2 | 21 | 18 | 39 | 0.419 | Unsatisfied | Satisfied | Unsatisfied |
| 19 redesigns | -1,0,1 | -1,0,1 | -1,0,1 | -1,0,1 | 0,1,2 | 21 | 19 | 40 | 0.396 | Unsatisfied | Satisfied | Unsatisfied |
| 20 redesigns | -1,0,1 | -1,0,1 | -1,0,1 | -1,0,1 | 0,1,2 | 21 | 20 | 41 | 0.379 | Satisfied | Satisfied | Satisfied |

INFORMATION PROCESSING METHOD, NON-TRANSITORY COMPUTER READABLE MEDIUM HAVING RECORDED THEREON PROGRAM, AND INFORMATION PROCESSING DEVICE

BACKGROUND

1. Technical Field

The present disclosure relates to an information processing method for designing process parameters, a non-transitory computer readable medium having recorded thereon a program for causing a computer to execute the information processing method, and an information processing device for designing process parameters.

2. Description of the Related Art

In recent years, it is required to set multiple process parameters (also referred to as control parameters) for various control targets due to complexity of a control process. For example, it is required to optimize and practice multiple control parameters in automobile engine control, semiconductor device manufacturing, chemical producing, or the like. In order to set such control parameters, search for optimum conditions of the control parameter for each control target is performed using an experimental design method.

Here, for example, in a method of setting an experimental design of the control parameter of an engine, normal data may not be obtained due to misfire of a vehicle engine. Even if there are missing points due to misfire of a vehicle engine or the like as described above, a method of efficiently securing accuracy in each characteristic model by performing the small number of additional experiments while utilizing normal data obtained in the experiments, is known (for example, see Japanese Patent Unexamined Publication No. 2006-17698).

Here, when the number of control parameters increases, the number of experimental candidate points increases rapidly. For example, when the number of control parameters is five, the number of experimental points in a central composite design is 29, and when 5 levels are set for each parameter, the total candidate points are $5^5 - 29 = 3,096$. Then, when 6 additional experimental points instead of the missing points are selected in a case where three points of 29 experimental points in the central composite design are missed, 6 points of the 3,096 candidate points need to be selected and combined, that is, one of $3096C6 = 10^{18}$ needs to be selected. The combination further increases when the number of control parameters reaches 6.

To solve such a problem, a setting method of an experimental design for control parameters capable of setting additional experimental points efficiently and accurately has been devised (for example, see Japanese Patent Unexamined Publication No. 2008-241337). The setting method of an experimental design disclosed in Japanese Patent Unexamined Publication No. 2008-241337 includes a step of determining whether or not a missing point exists in a first predetermined number of experimental points, and a step of setting a second predetermined number of additional experimental points. Regarding how a plurality of control parameters are changed with reference to the missing point, a plurality of searching directions are previously assigned to a plurality of priorities. The step of setting the additional experimental points includes a step of applying the plurality of searching directions in a descending order of the priorities and setting a candidate point of the additional experimental points until the control parameter of the missing point is changed to have the required number, and a step of selecting an additional experimental point of the required number of candidate points. As a result, an additional experimental point can be set efficiently and accurately.

SUMMARY

According to an aspect of the present disclosure, an information processing method includes: creating, by an experimental design method, a first table showing a plurality of combinations of experimental conditions for each of a plurality of control factors for obtaining an object variable by an experiment, the creating being performed based on a first plurality of level values set for each of the plurality of control factors; recording, in the first table, the object variable acquired based on the first table and acquired when an experimental condition of a first control factor that is not included in the plurality of control factors is fixed to one level value of a first level value and a second level value larger than the first level value; calculating a first response surface related to the object variable for the plurality of control factors using the first table in which the object variable is recorded; adding experimental conditions of the first control factor in which one level value of the first level value and the second level value is set to the plurality of combinations of the experimental conditions to the first table in which the object variable is recorded, when the calculated first response surface does not include a target value related to the object variable; setting the first plurality of level values for each of the plurality of control factors, and setting, for the first control factor, the second plurality of level values which include the other level value different from the one level value of the first level value and the second level value and a third level value different from the first level value and the second level value; creating, by the experimental design method, a second table showing a plurality of combinations of the experimental conditions for each of the plurality of control factors and the first control factor by adding a plurality of combinations of the experimental conditions for each of the plurality of control factors and the first control factor to the first table to which the experimental conditions of the first control factor is added, based on the first plurality of level values set for each of the plurality of control factors and the second plurality of level values set for the first control factor; recording, in the second table, an object variable acquired based on the second table; calculating a second response surface related to the object variable and including the target value for the plurality of control factors and the first control factor using the second table in which the object variable is recorded; and outputting the calculated second response surface.

According to an aspect of the present disclosure, an information processing device includes: a processor; and a memory, in which by executing a program stored in the memory, the processor creates, by an experimental design method, a first table showing a plurality of combinations of experimental conditions for each of a plurality of control factors for obtaining an object variable by an experiment, the creating being performed based on a first plurality of level values which are set for each of the plurality of control factors, records, in the first table, the object variable acquired based on the first table and acquired when an experimental condition of a first control factor that is not included in the plurality of control factors is fixed to one level value of a first level value and a second level value larger than the first level value, calculates a first response surface related to the object variable for the plurality of control factors using the first table in which the object variable is recorded, adds experimental conditions of the first control factor in which the one level value of the first level value and the second level value is set to the plurality of combinations of the experimental conditions to the first table in which the object variable is recorded, when the calculated first response surface does not include a target value related to the object variable, sets the second plurality of level values which include the other level value different from the one level value of the first level value and the second level value for the first control factor and a third level value different from the first level value and the second level value, creates, by the experimental design method, a second table showing a plurality of combinations of the experimental conditions for each of the plurality of control factors and the first control factor by adding a plurality of combinations of the experimental conditions for each of the plurality of control factors and the first control factor to the first table to which the experimental condition of the first control factor is added, based on the first plurality of level values set for each of the plurality of control factors and the second plurality of level values set for the first control factor, records, in the second table, an object variable acquired based on the second table, calculates a second response surface related to the object variable and including the target value for the plurality of control factors and the first control factor using the second table in which the object variable is recorded, and outputs the calculated second response surface.

BRIEF DESCRIPTION OF THE DRAWINGS

FIG. 3 is a table showing an example of the first table created by an experimental design method;

FIG. 4 is a table showing an example of the first table in which the object variable is recorded;

FIG. 6 is a table showing an example of the first table to which an experimental condition for the first control factor is added;

FIG. 10A is a table showing a first example of the second table in which the object variable is recorded;

FIG. 10B is a table showing the number of experimental designs when a highly accurate experimental design is obtained in a comparative example;

FIG. 10C is a table showing the number of experimental designs until a highly accurate experimental design is obtained in the first example;

FIG. 11A is a table showing a second example of the second table in which the object variable is recorded;

FIG. 11B is a table showing the number of experimental designs when a highly accurate experimental design is obtained in a comparative example;

FIG. 11C is a table showing the number of experimental designs until a highly accurate experimental design is obtained in the second example;

FIG. 12A is a table showing a second example of the second table in which the object variable is recorded;

FIG. 12B is a table showing the number of experimental designs when a highly accurate experimental design is obtained in a comparative example;

FIG. 12C is a table showing the number of experimental designs until a highly accurate experimental design is obtained in the third example.

DETAILED DESCRIPTIONS

Figure 1:
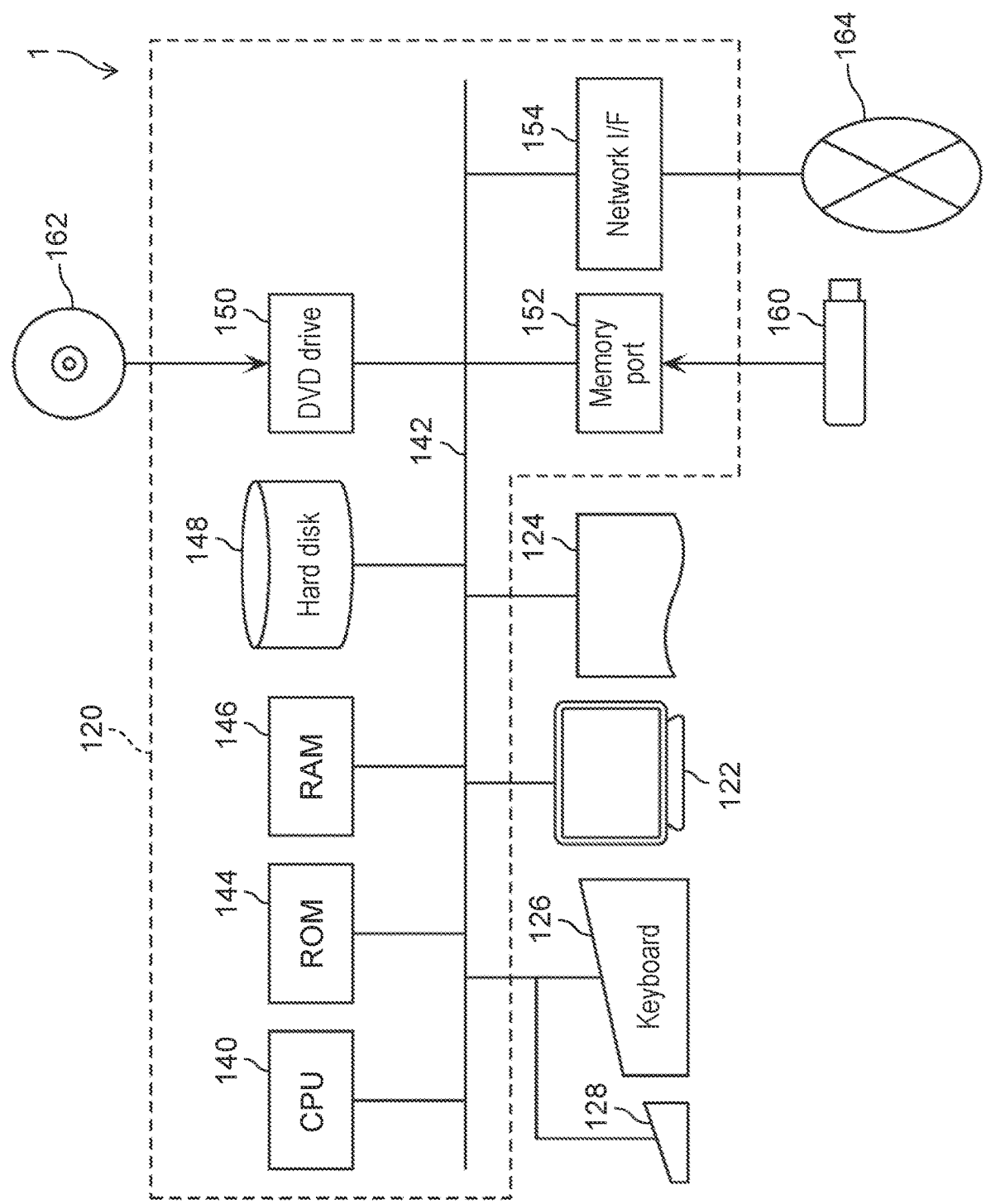
FIG. 1 is a configuration diagram illustrating an example of an information processing device according to an exemplary embodiment.

In the methods of the related art disclosed in Japanese Patent Unexamined Publication No. 2006-17698 and Japanese Patent Unexamined Publication No. 2008-241337, it is premised that the process is understood to some extent and there are thus few experimental points that are difficult to measure.

On the other hand, in a case of the complicated process, when an experimental range is set to be sufficiently large, it may be difficult to measure a large number of experimental points, and additional experimental points may become huge. In addition, when the experimental range is set to be small, optimum conditions cannot be obtained within the created response surface, and the experimental design needs to be created again in order to study outside the experimental range.

An object of the present disclosure is to provide an information processing method, a program, and an information processing device capable of efficiently setting an experimental design for a complicated process.

According to an aspect of the present disclosure, an information processing method includes: creating, by an experimental design method, a first table showing a combination of experimental conditions for each of a plurality of control factors for obtaining an object variable by an experiment, based on a first plurality of level values set for each of the plurality of control factors; recording, in the first table, the object variable acquired based on the created first table and acquired when an experimental condition of a first control factor that is not included in the plurality of control factors is fixed to one level value of a first level value and a second level value larger than the first level value; calculating a first response surface related to the object variable for the plurality of control factors using the first table in which the object variable is recorded; adding the experimental condition of the first control factor in which one level value of the first level value and the second level value is set to the combination of the experimental conditions to the first table in which the object variable is recorded, when the calculated first response surface does not include a target value related to the object variable; setting the first plurality of level values for each of the plurality of control factors, and setting, for the first control factor, the second plurality of level values which include the other level value different from the one level value of the first level value and the second level value and a third level value different from the first level value and the second level value; creating, by the experimental design method, a second table showing a combination of each of the plurality of control factors and the first control factor by adding the combination of the experimental conditions for each of the plurality of control factors and the first control factor to the first table to which the experimental condition of the first control factor is added, based on the first plurality of level values set for each of the plurality of control factors and the second plurality of level values set for the first control factor; recording an object variable acquired based on the created second table in the second table; calculating a second response surface related to the object variable and including the target value for the plurality of control factors and the first control factor using the second table in which the object variable is recorded; and outputting the calculated second response surface.

For example, in the initial experimental design using the first table created based on a plurality of control factors in which the first plurality of level values are set, when the first response surface does not include the target value related to the object variable (that is, experimental result is not obtained as desired), it was found that it is required to additionally adjust a level value of the first control factor without including the plurality of control factors. In this case, when the experiment is restarted by adding the first control factor to the plurality of the control factors, the number of experimental designs increases, resulting in inefficiency. On the other hand, in the experimental design using the second table, the experiment for the combination of the experimental conditions including the first control factor in which the fixed level value is set (that is, combination of the experimental conditions in the first table) is not restarted, and redesign is performed on the combination of the experimental conditions for each of the plurality of control factors in which the first plurality of level values are set and the first control factor in which the second plurality of level values are set. As a result, the desired experimental result can be obtained with a small number of redesigns. Therefore, according to the present disclosure, it is possible to efficiently set an experimental design for a complicated process.

For example, a third table showing a combination of experimental conditions for each of the plurality of control factors and the first control factor may be created based on the first plurality of level values set for each of the plurality of control factors and the first control factor, and the combination of the experimental conditions when the second table is created may be added until a value of an average prediction variance calculated for the second table is smaller than a value of an average prediction variance calculated for the third table.

Accordingly, since the calculated value of the average prediction variance for the second table is smaller than the value of the average prediction variance calculated for the third table, the experimental design can be set efficiently and accurately in the experimental design using the second table.

For example, setting of the third level value to the first control factor in the second table may be performed by any of a first pattern in which the third level value is set to be smaller than the first level value, a second pattern in which the third level value is set to be larger than the first level value and smaller than the second level value, and a third pattern in which the third level value is set to be larger than the second level value, creation of the second table may be performed on a first selection pattern selected from the first pattern, the second pattern, and the third pattern, the creation of the second table may be performed on any second selection pattern other than the first selection pattern selected from the first pattern, the second pattern, and the third pattern, when the second response surface including the target value cannot be calculated by the created second table in the first selection pattern, and the creation of the second table may be performed on a third selection pattern other than the first selection pattern selected from the first pattern, the second pattern, and the third pattern and the second selection pattern, when the second response surface including the target value cannot be calculated by the created second table in the second selection pattern.

Accordingly, even if the second response surface including the target value related to the object variable cannot be calculated by the created second table in the pattern selected from the first pattern, the second pattern, and the third pattern as a pattern of setting of the third level value, it is tested whether or not the second response surface including the target value related to the object variable can be calculated with other patterns as well, and thus it is possible to increase the possibility of outputting the second response surface including the target value related to the object variable.

For example, the first table may be created based on a central composite design method.

According to this, by using the central composite design method as the experimental design method, it is possible to set the experimental design more efficiently.

According to still another aspect of the present disclosure, there is provided a program for causing a computer to execute the information processing method.

According to still another aspect of the present disclosure, a non-transitory computer readable medium stores the program.

Accordingly, it is possible to provide a program capable of efficiently setting an experimental design for a complicated process.

According to an aspect of the present disclosure, an information processing device includes: a processor; and a memory, in which by executing a program stored in the memory, the processor creates, by an experimental design method, a first table showing a combination of experimental conditions for each of a plurality of control factors for obtaining an object variable by an experiment, based on a first plurality of level values which are set for each of the plurality of control factors, records, in the first table, the object variable acquired based on the created first table and acquired when an experimental condition of a first control factor that is not included in the plurality of control factors is fixed to one level value of a first level value and a second level value larger than the first level value, calculates a first response surface related to the object variable for the plurality of control factors using the first table in which the object variable is recorded, adds the experimental condition of the first control factor in which the one level value of the first level value and the second level value is set to the combination of the experimental conditions to the first table in which the object variable is recorded, when the calculated first response surface does not include a target value related to the object variable, sets the second plurality of level values which include the other level value different from the one level value of the first level value and the second level value for the first control factor and a third level value different from the first level value and the second level value, creates, by the experimental design method, a second table showing a combination of each of the plurality of control factors and the first control factor by adding the combination of the experimental conditions for each of the plurality of control factors and the first control factor to the first table to which the experimental condition of the first control factor is added, based on the first plurality of level values set for each of the plurality of control factors and the second plurality of level values set for the first control factor, records an object variable acquired based on the created second table in the second table, calculates a second response surface related to the object variable and including the target value for the plurality of control factors and the first control factor using the second table in which the object variable is recorded, and outputs the calculated second response surface.

Accordingly, it is possible to provide an information processing device capable of efficiently setting an experimental design for a complicated process.

The general and specific aspects may be implemented using a system, a method, an integrated circuit, a computer program, or a computer-readable recording medium such as CD-ROM, or any combination of systems, methods, integrated circuits, computer programs, or recording media.

Hereinafter, exemplary embodiments will be described in detail with reference to the drawings.

The exemplary embodiments described below show a general or specific example. Numerical values, shapes, materials, components, arrangement positions and connection modes of the components, steps, order of steps, and the like described in the following exemplary embodiments are merely examples, and therefore are not intended to limit the present disclosure.

EXEMPLARY EMBODIMENTS

Device

FIG. 1 is a configuration diagram illustrating an example of information processing device 1 according to an exemplary embodiment. FIG. 1 illustrates semiconductor memory 160, digital versatile disk read only memory (DVD ROM) 162, and network 164, in addition to information processing device 1.

Information processing device 1 according to the exemplary embodiment can be implemented as a program executed on computer system hardware and a computer system. Information processing device 1 illustrated herein is merely an example, and can be implemented as other configurations.

Referring to FIG. 1, information processing device 1 includes computer 120, monitor 122, keyboard 126, mouse 128, and printer 124. All of keyboard 126, monitor 122, mouse 128, and printer 124 are connected to computer 120. Information processing device 1 may not include monitor 122, printer 124, keyboard 126, and mouse 128.

Computer 120 includes DVD drive 150 and semiconductor memory port 152.

As illustrated in FIG. 1, computer 120 further includes bus 142 connected to DVD drive 150 and semiconductor memory port 152, CPU 140, and ROM 144 for storing a boot up program of computer 120. All of CPU 140 and ROM 144 are connected to bus 142.

Computer 120 further includes RAM 146 as a storage area for a program providing a work area used by CPU 140 and executed by CPU 140, hard disk drive 148 for storing initial experimental design data, experiment data, simulation data, additional experimental design data, optimum point setting data, optimal calculation point, and the like, and network interface 154 providing connection with network 164.

Software for implementing information processing device 1 according to the exemplary embodiment may be stored in hard disk drive 148 which is distributed in a form of an object code or script and stored in a medium such as DVD ROM 162 or semiconductor memory 160, and provided in computer 120 via a reading device such as DVD drive 150 or semiconductor memory port 152. When CPU 140 executes the program, the program is read from hard disk drive 148 and loaded into RAM 146. An instruction is fetched from an address specified by a program counter (not illustrated) and the instruction is executed. CPU 140 reads data to be processed from hard disk drive 148, and stores the processing result in hard disk drive 148. An optimized combination of experimental conditions is output from printer 124.

Since the general operation of computer 120 is well known, detailed descriptions thereof will be omitted.

Regarding a method of distributing the software, the software does not necessarily have to be fixed on a recording medium. For example, the software may be distributed from another computer connected to network 164. A part of the software may be stored in hard disk drive 148, and the remaining part of the software may be loaded into hard disk drive 148 via network 164 and integrated at the time of execution.

Moreover, the distribution form of software is not limited to an object code. The distribution form of software may be a script as described above, or a distribution form in which it may be supplied in a form of a source program to convert an appropriate compiler installed in computer 120 into an object code.

Typically, modern computers utilize general functions provided by a computer operating system (OS) to achieve the functions in a controlled manner according to the desired purpose. Therefore, even if the program does not include general functions that can be provided by the OS or a third party and specifies only a combination of execution orders of general functions, it is clear that the program is included in the scope of the disclosure as long as the program has a control structure that achieves the desired purpose as a whole.

Flow

Next, an operation of information processing device 1 according to the exemplary embodiment will be described with reference to FIG. 2.

Figure 2:
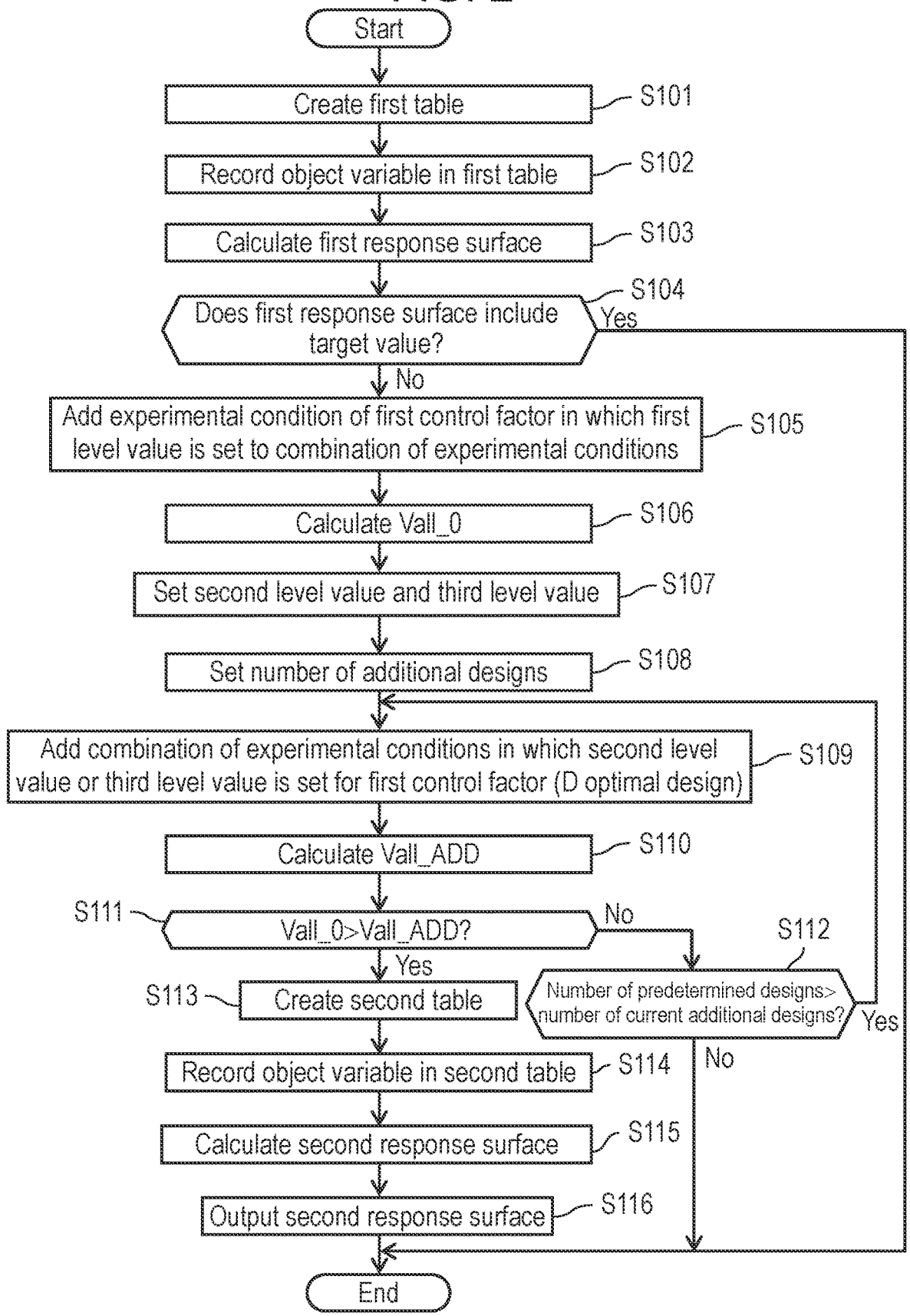
FIG. 2 is a flowchart illustrating an example of an information processing method according to an exemplary embodiment.

FIG. 2 is a flowchart illustrating an example of an information processing method according to the exemplary embodiment. FIG. 2 is a flowchart illustrating an example of the operation of information processing device 1 because the information processing method is executed by information processing device 1 (computer 120, specifically, processor (CPU 140)).

S101

First, in step S101, information processing device 1 creates, by an experimental design method, a first table showing a combination of experimental conditions for each of a plurality of control factors for obtaining an object variable by an experiment, based on a first plurality of level values which are set for each of the plurality of control factors.

An experimental design method (Design of Experiments: DOE) classically has various designs such as an orthogonal design method, a central composite design method, and a space filling design method according to the purpose. The orthogonal design method is weak in interaction, and the space filling design method tends to increase the number of experiments. It is assumed that in the complicated process, the interaction becomes strong and a time is required for the experiment or simulation. Therefore, the first table is created based on the central composite design method in the present exemplary embodiment.

The control factor is a controllable process parameter or design parameter, for example, a parameter such as a temperature, a humidity, a pressure, a speed, and the like. The level value is a value set for the control factor. For example, when the control factor is a temperature, the level value includes 0° C., 100° C., and 200° C. For example, when a chamber temperature in a semiconductor film forming process is set as a control factor, an object variable thereof is a film thickness in the semiconductor. A specific example of the first table created in step S101 is illustrated in FIG. 3.

FIG. 3 is a table showing an example of the first table created by an experimental design method. Each of X1, X2, X3, and X4 is a control factor, specifically, a temperature of the chamber. For example, the first plurality of level values are −1, 0, and 1, where −1 indicates 80° C., 0 indicates 90° C., and 1 indicates 100° C. FIG. 3 illustrates a first table including a combination of 21 experimental conditions for X1 to X4.

S102

Next, in step S102, information processing device 1 records, in the first table, the object variable acquired based on the created first table and acquired when the experimental condition of the first control factor that is not included in the plurality of control factors is fixed to one of a first level value and a second level value larger than the first level value. For example, information processing device 1 fixes the experimental conditions of the first control factor to the first level value, and records an object variable acquired by the experiment or simulation to the first table of a database (hereinafter, simply referred to as "DB") constructed in computer 120. FIG. 4 illustrates a specific example of the first table in which the object variable is recorded.

FIG. 4 is a table showing an example of the first table in which the object variable is recorded. X5 is the first control factor without including in the plurality of control factors (X1 to X4), and specifically, has a chamber temperature which is different from that of X1 to X4. The column of X5 is indicated by a broken line because X5 is not listed in the first table when the object variable is recorded. However, X5 is fixed to one of the first level value and the second level value, and managed. Here, the first level value is 0, the second level value is 1, and X5 is fixed to the first level value as one of the first level value and the second level value. Note that X5 may be fixed to the second level value.

S103

Next, in step S103, information processing device 1 calculates a first response surface related to the object variable for the plurality of control factors using the first table in which the object variable is recorded.

S104

Next, in step S104, information processing device 1 determines whether or not the first control factor includes a target value related to the object variable (hereinafter, target value related to the object variable is referred to as a target value) in the calculated first response surface. The process will be described with reference to FIGS. 5A and 5B.

Figure 5A:
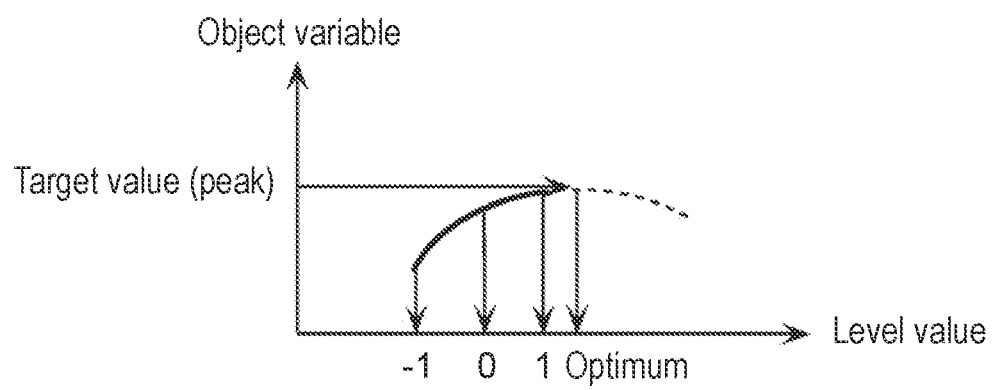
FIG. 5A is a diagram for explaining an example when a first response surface does not include a target value related to an object variable.

FIG. 5A is a diagram for explaining an example when a calculated first response surface does not include the target value.

Figure 5B:
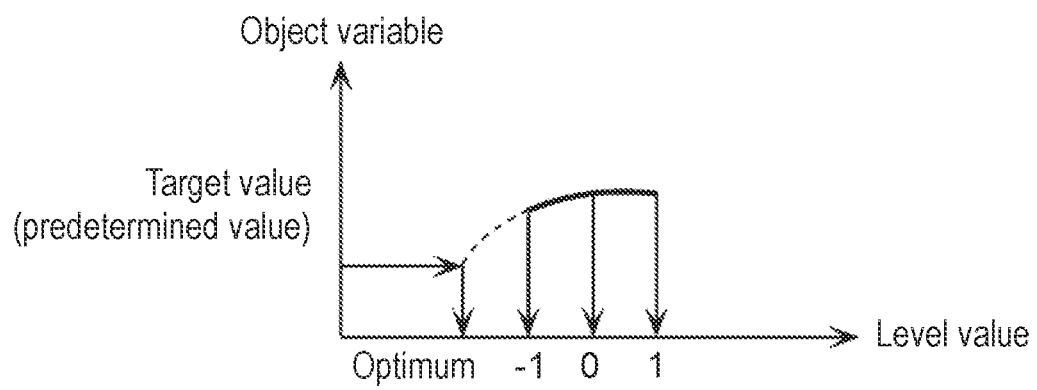
FIG. 5B is a diagram for explaining another example when the first response surface does not include a target value related to an object variable.

FIG. 5B is a diagram for explaining another example when a first response surface does not include the target value.

In FIGS. 5A and 5B, the first response surface is indicated by a solid line and a broken line. The solid line is the first response surface calculated using the first table in which the object variable is recorded, and the broken line is the first response surface estimated from the first table in which the object variable is recorded, in other words, the first response surface estimated from the calculated first response surface.

For example, setting of the optimum point is recorded in a memory of information processing device 1, and information processing device 1 calculates an optimum candidate point based on the first response surface calculated in step S103, and compares the setting of the recorded optimum point with the calculated optimum candidate point to determine whether or not the optimum point is realized by the plurality of control factors without including the first control factor (in other words, whether or not the calculated first response surface includes the target value). For example, the target value may be a peak of the first response surface or a predetermined value. FIG. 5A illustrates an optimum level value corresponding to the target value when the target value is the peak of the first response surface. FIG. 5B illustrates an optimum level value corresponding to the target value when the target value is a predetermined value. It can be seen that in both FIGS. 5A and 5B, the target value is not included in the calculated first response surface (solid line).

When the calculated first response surface does not include the target value (No in step S104), the first control factor is adopted as an extended control factor, and the process proceeds to step S105. When the calculated first response surface includes the target value (Yes in step S104), the flow ends because a desired experimental result is obtained in the initial experimental design. The target value is not limited to the peak of the first response surface, but may be the bottom thereof, and the predetermined value may be 0.

S105

Next, in step S105, when the calculated first response surface does not include the target value, information processing device 1 adds the experimental condition of the first control factor in which one of the first level value and the second level value is set to the combination of the experimental conditions in the first table in which the object variable is recorded. FIG. 6 illustrates a specific example of the first table to which an experimental condition for the first control factor is added.

FIG. 6 is a table showing an example of the first table in which an experimental condition for the first control factor is added. As described above, here, the first level value (0) is set as one of the first level value and the second level value in X5, which is the first control factor, and it can be seen that the experimental condition of X5 in which 0 is set is added to the first table.

S106

Next, in step S106, information processing device 1 evaluates the desired accuracy in the experimental design. There are various indicators to evaluate the accuracy in the experimental design, but relatively good results can be obtained by using an average prediction variance. For example, information processing device 1 creates a third table showing a combination of experimental conditions for each of the plurality of control factors and the first control factor, based on the first plurality of level values set for each of the plurality of control factors and the first control factor. A specific example of the third table is illustrated in FIG. 7.

Figures 7, 8:
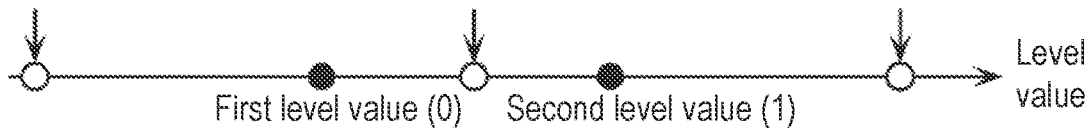
FIG. 7 is a table showing an example of a third table.
FIG. 8 is a diagram for explaining the existence of a third level value of three patterns.

FIG. 7 is a table showing an example of a third table. As illustrated in FIG. 7, in the third table, the first plurality of level values, which is the same as X1 to X4 of the plurality of control factors, that is, −1, 0, and 1 are set to X5 which is the first control factor, and an average prediction variance of the third table is calculated in assumption of a design when a general response surface methodology is applied to the number of control factors of the first table in a state where the X5 is added. The average prediction variance of the third table will be referred to as Vall_0 hereafter.

S107

Next, in step S106, information processing device 1 sets the first plurality of level values (for example, −1, 0, and 1) for each of the plurality of control factors, and sets, for the first control factor, the second plurality of level values including the other level value (for example, second level value) different from the one level value of the first level value (for example, 0) and the second level value (for example, 1) and a third level value different from the first level value and the second level value. When one of the first level value and the second level value is the second level value, the other level value different from the one level value becomes the first level value. The plurality of control factors and the first control factor are included in a second table to be described later, and the setting here is the setting of the level value for the first control factor in the second table.

The setting of the third level value in the second table is performed by any of a first pattern, a second pattern, and a third pattern. The process will be described with reference to FIG. 8.

FIG. 8 is a diagram for explaining the existence of a third level value of three patterns.

As illustrated in FIG. 8, the first pattern is a pattern in which the third level value is set smaller than the first level value. In the first pattern, the third level value is set to, for example, −1. The second pattern is a pattern in which the third level value is set larger than the first level value and smaller than the second level value. In the second pattern, the third level value is set to, for example, 0.5. The third pattern is a pattern in which the third level value is set larger than the second level value. In the third pattern, the third level value is set to, for example, 2. For example, a user selects any of the first pattern, the second pattern, and the third pattern.

S108

Next, in step S108, information processing device 1 sets the number of designs to be added.

S109

Next, in step S109, information processing device 1 adds a design to the first table in which the combination of the experimental conditions for each of the plurality of control factors and the first control factor is operated earlier (that is, the first table to which an experimental condition of the first control factor is added), based on the second plurality of level values set for the first plurality of level values and the first control factor which are set for each of the plurality of control factors. As a method of determining a content of the combination of the experimental conditions to be added, there are various methods, such as a D optimal design or an I optimal design, depending on the purpose. The I optimal design places priority to minimization of a prediction variance in the entire design area, whereas the D optimal design places priority to reduction of a prediction variance at each design point. For example, since better results are often obtained when the design is determined by the D optimal design, the D optimal design is adopted here.

S110

Next, in step S110, information processing device 1 calculates an average prediction variance of an additional experimental design added by the combination of the experimental conditions, and evaluates accuracy in the additional experimental design using the average prediction variance as in the third table. Hereinafter, the average prediction variance of the additional experimental design is referred to as Vall_ADD.

S111

Next, in step S111, information processing device 1 evaluates the accuracy in the additional experimental design by determining whether or not Vall_0 exceeds Vall_ADD. Step S111 will be described with reference to FIG. 9.

Figure 9:
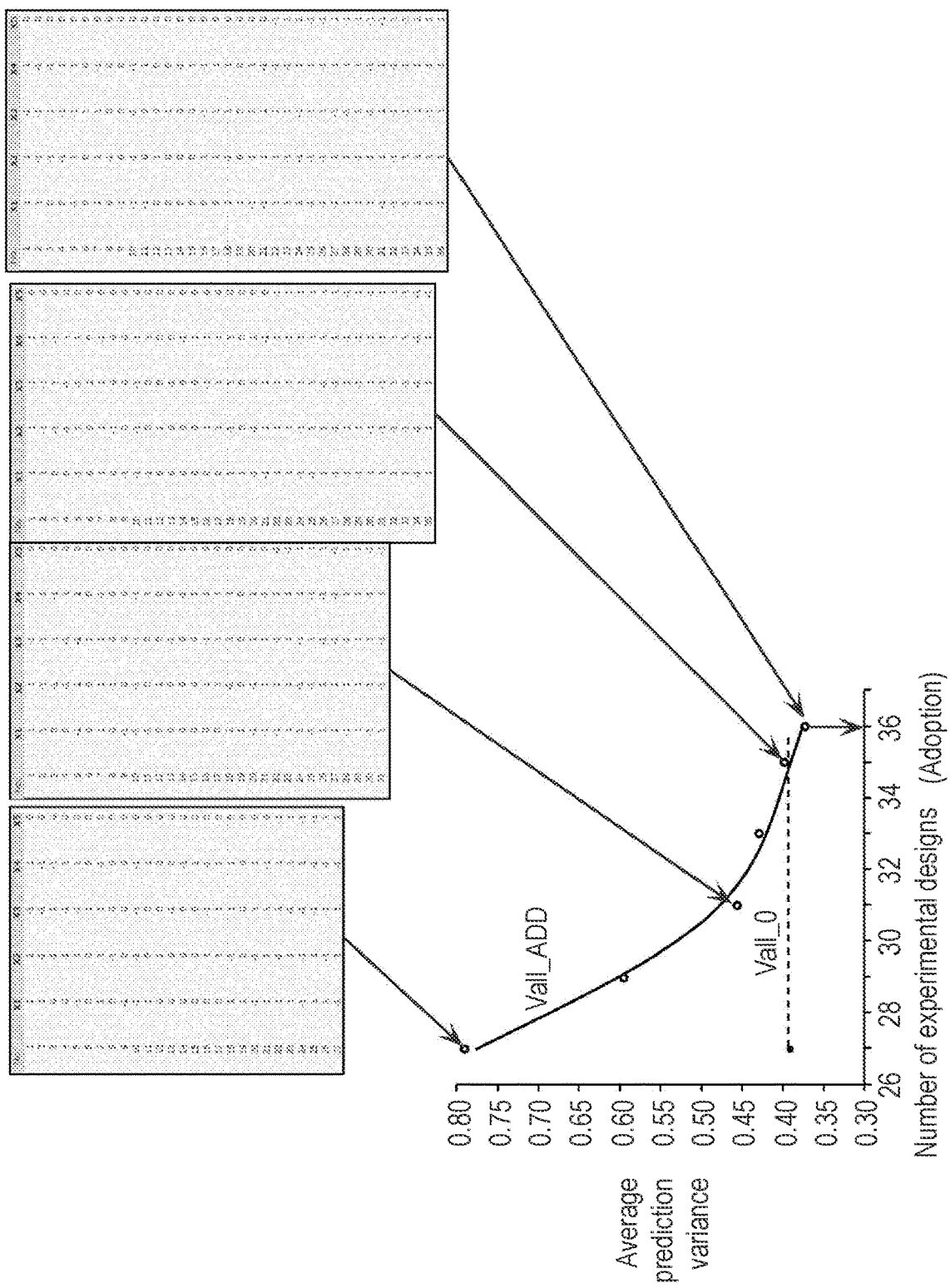
FIG. 9 is a diagram for explaining a method of adopting the number of experimental designs.

FIG. 9 is a diagram for explaining a method of adopting the number of experimental designs, specifically, a diagram for explaining a method of adopting the number of experimental designs when the additional experimental design has high accuracy.

As illustrated in FIG. 9, for the number of additional experimental designs, Vall_ADD decreases as the number of designs increases, for example, the number of designs is 36, such that it can be seen that Vall_ADD falls below Vall_0. When Vall_0 which indicates accuracy in the experimental design using the third table falls below Vall_ADD which indicates the accuracy in the additional experimental design, that is, Vall_0>Vall_ADD (Yes in step S111), information processing device 1 stops to add the combination of the experimental conditions, and the process proceeds to step S113. In addition, when Vall_0 is equal to or smaller than Vall_ADD, that is, Vall_0<Vall_ADD (No in step S111), the process proceeds to step S112.

S112

When the number of current additional designs is equal to or larger than the number of predetermined designs (No in step S112), information processing device 1 ends the flow. For example, the number of predetermined designs is the number of designs of the first table (that is, the number of initial designs) in some cases. That is, when the number of additional designs exceeds the number of initial designs, the experimental design cannot be set efficiently, and the flow is terminated. When the number of current additional designs is smaller than the number of predetermined designs (Yes in step S112), information processing device 1 adds the combination of the experimental conditions by performing step S109 again. The combination of experimental conditions does not have to be added one by one, and a plurality of combinations may be added.

Here, an example in which the combination of the experimental conditions is added to the first control factor, in which the third level value of one pattern selected from the first pattern, the second pattern, and the third pattern, is set and the combination of the experimental conditions in which the third level value of the other pattern is set that is not selected is not added, will be described. An example in which the combination of the experimental conditions in which the third level value of the other pattern is set is added, will be described with reference to a modified example to be described later.

S113

Next, in step S113, information processing device 1 determines the content of the experiment to be added, and creates a second table showing the combination of the experimental conditions for each of the plurality of control factors and the first control factor by an experimental design method.

S114

Next, in step S114, information processing device 1 records an object variable acquired based on the created second table in the second table. A specific example of the second table in which the object variable is recorded will be described later with reference to FIG. 10A and the like.

S115

Next, in step S115, information processing device 1 calculates a second response surface including a target value and related to the object variable for the plurality of control factors and the first control factor using the second table in which the object variable is recorded.

S116

Then, information processing device 1 outputs the second response surface in step S116.

Specific Example of Three Patterns

Next, the present disclosure will be described with reference to specific examples of the three patterns of setting the third level value.

FIGS. 10A to 10C are diagrams for explaining an example (first example) when the combination of the experimental conditions in which the third level value (that is, −1) of the first pattern is set is added to X5 which is the first control factor.

FIG. 10A is a table showing a first example of the second table in which the object variable is recorded.

FIG. 10B is a table showing the number of experimental designs when a highly accurate experimental design is obtained in a comparative example.

FIG. 10C is a table showing the number of experimental designs until a highly accurate experimental design is obtained in the first example.

As illustrated in No. 22 to No. 36 in the second table illustrated in FIG. 10A, it can be seen that the combination of the experimental conditions for each of the plurality of control factors (X1 to X4) in which the first plurality of level values are set and the first control factor (X5) in which the second plurality of level values including −1, which is the third level value of the first pattern, are set is added to the first table (No. 1 to No. 21).

In a case of a method of the related art as illustrated in FIG. 10B, the first plurality of level values set in the plurality of control factors (X1 to X4) are also set in the first control factor (X5), and the experimental design is recreated again by adding the experimental condition of the first control factor (X5). Therefore, the total number of designs in a case of the related art is, for example, 48. On the other hand, in a case of the method of the present disclosure as illustrated in FIG. 10C, the combination of the 6 experimental conditions is additionally added (extended) to 21, which is the number of designs (initial number of designs) in the first table as a redesign, and thus it can be confirmed that the optimum value is obtained with the total number of designs of 27 (that is, a second response surface including a target value can be calculated). The combination of 15 experimental conditions is added (extended) to 21, which is the number of designs (initial number of designs) in the first table as a redesign, and thus it can be confirmed that Vall_ADD falls below Vall_0 (0.391), and the sufficient accuracy in the experimental design is obtained. That is, in a case of the method of the present disclosure, the total number of designs is 36, and the same result can be obtained as in the method of the related art in which the number of designs is smaller than 12 (in other words, the experimental design can be set efficiently and accurately with 12 designs which are smaller than that in the method of the related art). In FIG. 10C, when Vall_ADD falls below Vall_0, the evaluation is shown as "satisfied". Conversely, when Vall_ADD exceeds Vall_0, the evaluation is shown as "unsatisfied." When the optimum value is obtained, the evaluation is shown as "satisfied". Conversely, when the optimum value is not obtained, the evaluation is shown as "unsatisfied". When both evaluations of Vall_ADD and the optimum value are satisfactory, the overall evaluation is shown as "satisfied". When either the evaluations of Vall_ADD and the optimum value are unsatisfactory, the overall evaluation is shown as "unsatisfied". The same applies to FIGS. 10B, 11B, 11C, 12B, and 12C.

Further, FIGS. 11A to 11C are diagrams for explaining an example (second example) when the combination of the experimental conditions in which a third level value (that is, 0.5) of the second pattern is set is added to X5 which is the first control factor.

FIG. 11A is a table showing a second example of the second table in which the object variable is recorded;

FIG. 11B is a table showing the number of experimental designs when a highly accurate experimental design is obtained in a comparative example.

FIG. 11C is a table showing the number of experimental designs until a highly accurate experimental design is obtained in the second example.

As illustrated in No. 22 to No. 41 in the second table illustrated in FIG. 11A, it can be seen that the combination of the experimental conditions for each of the plurality of control factors (X1 to X4) in which the first plurality of level values are set and the first control factor (X5) in which the second plurality of level values including 0.5, which is the third level value of the second pattern, are set is added to the first table (No. 1 to No. 21).

In a case of a method of the related art as illustrated in FIG. 11B, the first plurality of level values set in the plurality of control factors (X1 to X4) are also set in the first control factor (X5), and the experimental design is recreated again by adding the experimental condition of the first control factor (X5). Therefore, the total number of designs in a case of the related art is, for example, 48. On the other hand, in a case of the method of the present disclosure as illustrated in FIG. 11C, the combination of the 8 experimental conditions is additionally added (extended) to 21, which is the number of designs (initial number of designs) in the first table as a redesign, and thus it can be confirmed that the optimum value is obtained with the total number of designs of 29 (that is, a second response surface including a target value can be calculated). The combination of 20 experimental conditions is added (extended) to 21, which is the number of designs (initial number of designs) in the first table as a redesign, and thus it can be confirmed that Vall_ADD falls below Vall_0 (0.391), and the sufficient accuracy in the experimental design is obtained. That is, in a case of the method of the present disclosure, the total number of designs is 41, and the same result can be obtained as in the method of the related art in which the number of designs is smaller than 7 (in other words, the experimental design can be set efficiently and accurately with 7 designs which are smaller than that in the method of the related art).

Finally, FIGS. 12A to 12C are diagrams for explaining an example (third example) when the combination of the experimental conditions in which the third level value (that is, 2) of the third pattern is set is added to X5 which is the first control factor.

FIG. 12A is a table showing a third example of the second table in which the object variable is recorded.

FIG. 12B is a table showing the number of experimental designs when a highly accurate experimental design is obtained in a comparative example.

FIG. 12C is a table showing the number of experimental designs until a highly accurate experimental design is obtained in the third example.

As illustrated in No. 22 to No. 41 in the second table illustrated in FIG. 12A, it can be seen that the combination of the experimental conditions for each of the plurality of control factors (X1 to X4) in which the first plurality of level values are set and the first control factor (X5) in which the second plurality of level values including 2, which is the third level value of the third pattern, are set is added to the first table (No. 1 to No. 21).

In a case of a method of the related art as illustrated in FIG. 12B, the first plurality of level values set in the plurality of control factors (X1 to X4) are also set in the first control factor (X5), and the experimental design is recreated again by adding the experimental condition of the first control factor (X5). Therefore, the total number of designs in a case of the related art is 48. On the other hand, in a case of the method of the present disclosure as illustrated in FIG. 12C, the combination of the 8 experimental conditions is additionally added (extended) to 21, which is the number of designs (initial number of designs) in the first table as a redesign, and thus it can be confirmed that the optimum value is obtained with the total number of designs of 29 (that is, a second response surface including a target value can be calculated). The combination of 20 experimental conditions is added (extended) to 21, which is the number of designs (initial number of designs) in the first table as a redesign, and thus it can be confirmed that Vall_ADD falls below Vall_0 (0.391), and the sufficient accuracy in the experimental design is obtained. That is, in a case of the method of the present disclosure, the total number of designs is 41, and the same result can be obtained as in the method of the related art in which the number of designs is smaller than 7 (in other words, the experimental design can be set efficiently and accurately with 7 designs which are smaller than that in the method of the related art).

It should be noted that all steps are not required in the flow illustrated in FIG. 2, and when designs and experiments have been made in advance, the steps may be executed from step S104, for example.

Modified Example

Examples in which the combination of the experimental conditions in which the third level value of one pattern selected from the first pattern, the second pattern, and the third pattern is set is added to the first control factor, and the combination of the experimental conditions in which the third level value of the other pattern that is not selected is set is not added, have been described. However, an example which is obtained by adding the combination of the experimental conditions in which the third level value of the other pattern is set will be described as a modified example.

Figure 13:
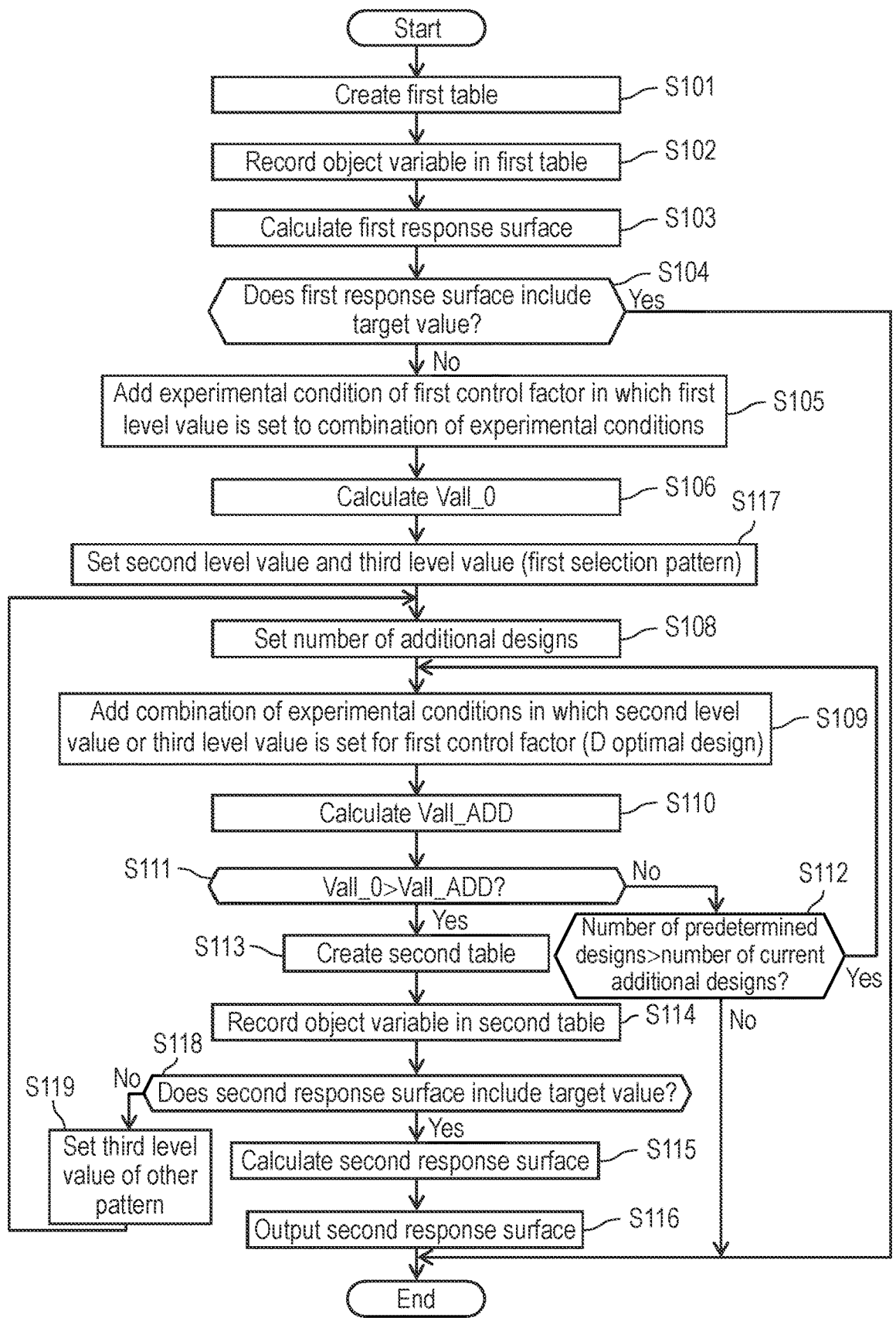
FIG. 13 is a flowchart illustrating an example of an information processing method according to a modified example.

FIG. 13 is a flowchart illustrating an example of an information processing method according to a modified example. The description for the same steps as the information processing method according to the exemplary embodiment will be omitted, and different points will be described.

S117

In step S117, information processing device 1 sets the second plurality of level values including the other level value (for example, second level value) of the first level value (for example, 0) and the second level value (for example, 1) for the first control factor and the third level value different from the first level value and the second level value. In step S113, the creation of the second table is performed on a first selection pattern selected from the first pattern, the second pattern, and the third pattern. Here, for example, the first pattern is selected as the first selection pattern.

S118

In steps S108 to S113, the second table is created by adding the combination of the experimental conditions in which the third level value of the first selection pattern (for example, first pattern) is set to the first control factor, and information processing device 1 determines whether or not the calculated second response surface includes the target value using the created second table. That is, information processing device 1 determines whether or not the second response surface including the target value can be calculated by the created second table in the first selection pattern. When the second response surface including the target value can be calculated by the created second table in the first selection pattern (Yes in step S118), the process proceeds to step S115, and when the second response surface including the target value cannot be calculated by the created second table in the first selection pattern (No in step S118), the process proceeds to step S119.

S119

When the second response surface including the target value cannot be calculated by the created second table in the first selection pattern, the creation of the second table in step S113 is performed on any second selection pattern other than the first selection pattern selected from the first pattern, the second pattern, and the third pattern. For example, since the first pattern has already been selected as the first selection pattern, the second pattern is selected as the second selection pattern here.

Then, as in the first selection pattern, in steps S108 to S113, the second table is created by adding the combination of the experimental conditions in which the third level value of the second selection pattern (for example, second pattern) is set to the first control factor, and information processing device 1 determines whether or not the calculated second response surface includes the target value using the created second table. That is, information processing device 1 determines whether or not the second response surface including the target value can be calculated by the created second table in the second selection pattern. When the second response surface including the target value can be calculated by the created second table in the second selection pattern (Yes in step S118), the process proceeds to step S115, and when the second response surface including the target value cannot be calculated by the created second table in the second selection pattern (No in step S118), the process proceeds to step S119.

When the second response surface including the target value cannot be calculated by the created second table in the first selection pattern, the creation of the second table is performed on a third selection pattern other than the first selection pattern and the second selection pattern selected from the first pattern, the second pattern, and the third pattern. Since the first pattern and the second pattern have already been selected as the first selection pattern and the second selection pattern, respectively, the third pattern is selected as the third selection pattern here.

When the second response surface including the target value cannot be calculated even by the created second table in the third selection pattern, the flow ends.

Other Exemplary Embodiments

Although the information processing method and information processing device 1 according to the exemplary embodiments and the modified example have been described above, the present disclosure is not limited to the above exemplary embodiments and the modified example.

For example, the steps in the information processing method may be executed by a computer (computer system). In addition, the present disclosure can be implemented as a program for causing a computer to execute the steps included in the methods. Further, the present disclosure may be implemented as a non-transitory computer-readable recording medium having recorded thereon the program, such as CD-ROM.

For example, when the present disclosure is implemented by a program (software), hardware resources, such as a CPU, a memory, and an input/output circuit in the computer, are utilized to execute the program to thereby execute the steps. That is, the CPU obtains data from the memory, the input/output circuit, or the like, performs a computational operation, and outputs a result of the computational operation to the memory, the input/output circuit, or the like to thereby execute the steps.

Some or all of the processing units included in information processing device 1 according to the above exemplary embodiments and the modified example are typically implemented as an LSI which is an integrated circuit. These processing units may be formed as separate chips, or some or all of the processing units may be included in a chip.

Also, the circuit integration is not limited to LSI, and may be implemented using a dedicated circuit or general-purpose processor. A field programmable gate array (FPGA) that is programmable after manufacturing of an LSI or a reconfigurable processor in which connections and settings of circuit cells within the LSI are reconfigurable may be used.

Each of the components in the above exemplary embodiments and the modified example may be configured in the form of a dedicated hardware product, or may be implemented by executing a software program suitable for each structural element. Each of the components may be implemented by means of a program executing unit, such as a CPU and a processor, reading and executing the software program recorded on a recording medium such as a hard disk or a semiconductor memory.

Further, the order in which the steps of each flowchart are performed is merely an example provided to specifically describe the present disclosure. Accordingly, the order is not limited to that described above. Also, one or more of the steps described above may be performed simultaneously with (in parallel to) other steps.

Although the information processing method and information processing device 1 according to one or more aspects have been described based on the exemplary embodiments and the modified example, the present disclosure is not limited to the exemplary embodiments and the modified example. Other forms in which various modifications apparent to those skilled in the art are applied to any of the aforementioned exemplary embodiments and the modified example, or forms structured by combining components of different aspects of the exemplary embodiments may be included within the scope of the one or more aspects, unless such changes and modifications depart from the scope of the present disclosure.

The present disclosure can be widely used in a general electronic component, capacitors and in-vehicle batteries, or in general manufacturing processes and control processes from machining processes to chemical processes.

What is claimed is:

1. An information processing method for determining process parameters for a control target, comprising:
    creating, by an experimental design method, a first table showing a plurality of combinations of experimental conditions for each of a plurality of control factors for obtaining an object variable by an experiment, the creating being performed based on a first plurality of level values set for each of the plurality of control factors;
    recording, in the first table, the object variable acquired based on the first table and acquired when an experimental condition of a first control factor that is not included in the plurality of control factors is fixed to one level value of a first level value and a second level value larger than the first level value;
    calculating a first response surface related to the object variable for the plurality of control factors using the first table in which the object variable is recorded;
    adding experimental conditions of the first control factor in which the one level value of the first level value and the second level value is set to the plurality of combinations of the experimental conditions to the first table in which the object variable is recorded, when the calculated first response surface does not include a target value related to the object variable;
    setting the first plurality of level values for each of the plurality of control factors, and setting, for the first control factor, the second plurality of level values which include the other level value different from the one level value of the first level value and the second level value and a third level value different from the first level value and the second level value;
    creating, by the experimental design method, a second table showing a plurality of combinations of the experimental conditions for each of the plurality of control factors and the first control factor by adding a plurality of combinations of the experimental conditions for each of the plurality of control factors and the first control factor to the first table to which the experimental conditions of the first control factor is added, based on the first plurality of level values set for each of the plurality of control factors and the second plurality of level values set for the first control factor;
    recording, in the second table, an object variable acquired based on the second table;
    calculating a second response surface related to the object variable and including the target value for the plurality of control factors and the first control factor using the second table in which the object variable is recorded; and
    outputting the calculated second response surface for controlling an operation of the control target.

2. The information processing method of claim 1, wherein a third table showing a plurality of combinations of experimental conditions for each of the plurality of control factors and the first control factor is created based on the first plurality of level values set for each of the plurality of control factors and the first control factor, and
    adding a plurality of combinations of the experimental conditions when the second table is created is performed until a value of an average prediction variance calculated for the second table is smaller than a value of an average prediction variance calculated for the third table.

3. The information processing method of claim 1, wherein setting of the third level value to the first control factor in the second table is performed by any of
    a first pattern in which the third level value is set to be smaller than the first level value, a second pattern in which the third level value is set to be larger than the first level value and smaller than the second level value, and a third pattern in which the third level value is set to be larger than the second level value, and wherein the second table is created based on an iterative process including:

a first iterative process based on a first selection pattern selected from the first pattern, the second pattern, and the third pattern, when the second response surface including the target value is able to be calculated using the first selection pattern, a second iterative process based on any second selection pattern, when the second response surface including the target value is not able to be calculated using the first selection pattern, and a third iterative process based on a third selection pattern, when the second response surface including the target value is not able to be calculated using the first selection pattern or the second selection pattern.

4. The information processing method of claim 1, wherein the first table is created based on a central composite design method.

5. A non-transitory computer readable medium having recorded thereon a program for causing a computer to execute the information processing method of claim 1.

6. An information processing device for determining process parameters for a control target, comprising:

a processor; and a memory, wherein by executing a program stored in the memory, the processor;

creates, by an experimental design method, a first table showing a plurality of combinations of experimental conditions for each of a plurality of control factors for obtaining an object variable by an experiment, the creating being performed based on a first plurality of level values which are set for each of the plurality of control factors, records, in the first table, the object variable acquired based on the first table and acquired when an experimental condition of a first control factor that is not included in the plurality of control factors is fixed to one level value of a first level value and a second level value larger than the first level value, calculates a first response surface related to the object variable for the plurality of control factors using the first table in which the object variable is recorded, adds experimental conditions of the first control factor in which the one level value of the first level value and the second level value is set to the plurality of combinations of the experimental conditions to the first table in which the object variable is recorded, when the calculated first response surface does not include a target value related to the object variable, sets the second plurality of level values which include the other level value different from the one level value of the first level value and the second level value for the first control factor and a third level value different from the first level value and the second level value, creates, by the experimental design method, a second table showing a plurality of combinations of the experimental conditions for each of the plurality of control factors and the first control factor by adding a plurality of combinations of the experimental conditions for each of the plurality of control factors and the first control factor to the first table to which the experimental condition of the first control factor is added, based on the first plurality of level values set for each of the plurality of control factors and the second plurality of level values set for the first control factor, records, in the second table, an object variable acquired based on the second table, calculates a second response surface related to the object variable and including the target value for the plurality of control factors and the first control factor using the second table in which the object variable is recorded, and outputs the calculated second response surface for controlling an operation of the control target.

* * * * *